US011758063B2

United States Patent
Nagata et al.

(10) Patent No.: US 11,758,063 B2
(45) Date of Patent: Sep. 12, 2023

(54) IMAGE READING APPARATUS AND IMAGE FORMING APPARATUS

(71) Applicant: CANON KABUSHIKI KAISHA, Tokyo (JP)

(72) Inventors: Teppei Nagata, Chiba (JP); Tomohito Nakagawa, Chiba (JP); Yukihiro Soeta, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/903,122

(22) Filed: Sep. 6, 2022

(65) Prior Publication Data

US 2023/0089229 A1 Mar. 23, 2023

(30) Foreign Application Priority Data

Sep. 22, 2021 (JP) ................. 2021-154346

(51) Int. Cl.
*H04N 1/00* (2006.01)

(52) U.S. Cl.
CPC ..... *H04N 1/00615* (2013.01); *H04N 1/00092* (2013.01); *H04N 1/00557* (2013.01); *H04N 1/00559* (2013.01); *H04N 1/00602* (2013.01); *H04N 1/00795* (2013.01)

(58) Field of Classification Search
CPC ........... H04N 1/00013; H04N 1/00018; H04N 1/00092; H04N 1/00519–00679; H04N 1/00681–00761; H04N 1/00785–00827; H04N 1/00835; H04N 1/00909; H04N 1/024–0318; H04N 1/04–207; H04N 2201/024–04798
USPC ....................................................... 358/498
See application file for complete search history.

(56) References Cited

U.S. PATENT DOCUMENTS

| 5,307,133 A | 4/1994 | Koshimizu et al. |
| 5,343,279 A | 8/1994 | Nagata et al. |
| 5,351,112 A | 9/1994 | Naito et al. |
| 5,455,667 A | 10/1995 | Hiroi et al. |
| 5,552,859 A | 9/1996 | Nakagawa et al. |
| 5,579,083 A | 11/1996 | Naito et al. |
| 5,621,501 A | 4/1997 | Matsuo et al. |
| 5,819,151 A | 10/1998 | Naito et al. |
| 5,833,230 A | 11/1998 | Nakagawa et al. |
| 6,021,305 A | 2/2000 | Sato et al. |
| 6,038,424 A | 3/2000 | Nakagawa |

(Continued)

FOREIGN PATENT DOCUMENTS

JP   H-1169043 A   8/1997

OTHER PUBLICATIONS

Feb. 3, 2023 European Official Action in European Patent Appln. No. 22194537.1.

*Primary Examiner* — Negussie Worku
(74) *Attorney, Agent, or Firm* — Venable LLP

(57) ABSTRACT

An image reading apparatus includes a transparent member, a conveyance unit, a reading unit reading an image information through the transparent member from the sheet conveyed by the conveyance unit, and a guide member provided upstream of a reading position where the reading unit reads the image information from the sheet with respect to a sheet conveyance direction. The guide member includes a sheet-like sheet member having elasticity. A leading end of a downstream side of the guide member in the sheet conveyance direction is a folded portion formed by folding back the sheet member.

16 Claims, 9 Drawing Sheets

(56) References Cited

U.S. PATENT DOCUMENTS

| | | | |
|---|---|---|---|
| 6,098,977 | A | 8/2000 | Sato et al. |
| 6,131,898 | A | 10/2000 | Hiroi et al. |
| 7,034,925 | B2 | 4/2006 | Kamiyama et al. |
| 8,688,019 | B2 | 4/2014 | Nagata |
| 9,079,727 | B2 | 7/2015 | Nakagawa |
| 9,193,544 | B2 | 11/2015 | Nakagawa et al. |
| 9,272,857 | B2 | 3/2016 | Nakagawa et al. |
| 9,434,561 | B2 | 9/2016 | Nakagawa et al. |
| 9,592,973 | B2 | 3/2017 | Kushida et al. |
| 9,701,500 | B2 | 7/2017 | Sugaya et al. |
| 10,315,868 | B2 | 6/2019 | Nakagawa |
| 2011/0081182 | A1* | 4/2011 | Takiguchi ............ G03G 15/657 399/400 |
| 2012/0106987 | A1 | 5/2012 | Furusawa et al. |
| 2012/0236375 | A1* | 9/2012 | Fujita .................... H04N 1/123 358/498 |
| 2013/0063337 | A1* | 3/2013 | Wright .................. G06F 3/0346 345/156 |
| 2017/0205749 | A1* | 7/2017 | Adaniya .................. B65H 5/38 |
| 2018/0220034 | A1* | 8/2018 | Katayama .......... H04N 1/00798 |
| 2021/0274056 | A1* | 9/2021 | Watanabe .......... H04N 1/00559 |

\* cited by examiner

IMAGE READING APPARATUS AND IMAGE FORMING APPARATUS

FIELD OF THE INVENTION AND RELATED ART

This invention relates to an image reading apparatus which reads image information from a sheet and an image forming apparatus which forms an image on the sheet.

Conventionally, as the image reading apparatus, an apparatus which reads image information from a document or an apparatus which reads image information on a recording material which is formed by the image forming apparatus and feed it back to the image forming apparatus, are known. The image reading apparatus acquires image information by optically scanning the sheet which is fed along a surface of a transparent member such as a reading glass with a reading unit such as a contact image sensor (CIS). In Japanese Laid-Open Patent Application (JP-A) Hei 11-69043, it is described that a sheet-shaped guide member, which is arranged so that it protrudes from a contact glass toward an upstream side with respect to a direction of conveying document, guides a leading end of the document which is fed from the upstream to a surface of the contact glass.

However, when a leading end of the guide member which guides the sheet toward a transparent member is a sharp edge, pressure is concentrated on a contact portion between the sheet and the leading end of the guide member. Therefore, foreign matter such as paper dust, toner, etc. may be generated at the leading end of the guide member and adhere to the surface of the transparent member. Adhesion of such foreign matter may cause striped noise to an image data which is scanned by the reading unit.

SUMMARY OF THE INVENTION

A principal object of the present invention is to provide an image reading apparatus which is able to suppress generating paper dust, etc., and an image forming apparatus which is provide with the image reading apparatus.

According to an aspect of the present invention, there is provide an image reading apparatus comprising: a transparent member, a conveyance unit configured to convey a sheet; a reading unit configured to read an image information through the transparent member from the sheet conveyed by the conveyance unit and; a guide member provided upstream of a reading position where the reading unit reads the image information from the sheet with respect to a sheet conveyance direction and configured to guide the sheet to the reading position, wherein the guide member includes a sheet-like sheet member having elasticity, and wherein a leading end of a downstream side of the guide member with respect to the sheet conveyance direction is a folded portion formed by folding back the sheet member.

According to another aspect of the present invention, there is provide an image forming apparatus comprising: an image forming unit configured to form an image on a sheet; a transparent member; a conveyance unit configured to convey the sheet on which the image is formed by the image forming unit; a reading unit configured to read an image information through the transparent member from the sheet conveyed by the conveyance unit; and a guide member provided upstream of a reading position where the reading unit reads the image information from the sheet with respect to a sheet conveyance direction and configured to guide the sheet to the reading position, wherein the guide member includes a sheet-like sheet member having elasticity, and wherein a leading end of a downstream side of the guide member with respect to the sheet conveyance direction is a folded portion formed by folding back the sheet member.

According to further aspect of the present invention, there is provide an image forming apparatus comprising: a transparent member; a conveyance unit configured to convey a sheet; a reading unit configured to read an image information through the transparent member from the sheet conveyed by the conveyance unit; a guide member provided upstream of a reading position where the reading unit reads the image information from the sheet with respect to a sheet conveyance direction and configured to guide the sheet to the reading position; and an image forming unit configured to form an image on a recording material based on the image information read by the reading unit, wherein the guide member includes a sheet-like sheet member having elasticity, and wherein a leading end of a downstream side of the guide member with respect to the sheet conveyance direction is a folded portion formed by folding back the sheet member.

Further features of the present invention will become apparent from the following description of exemplary embodiments with reference to the attached drawings.

DESCRIPTION OF THE EMBODIMENTS

In the following, embodiments of the present invention will be described with reference to Figures.

First Embodiment

Figure 1:
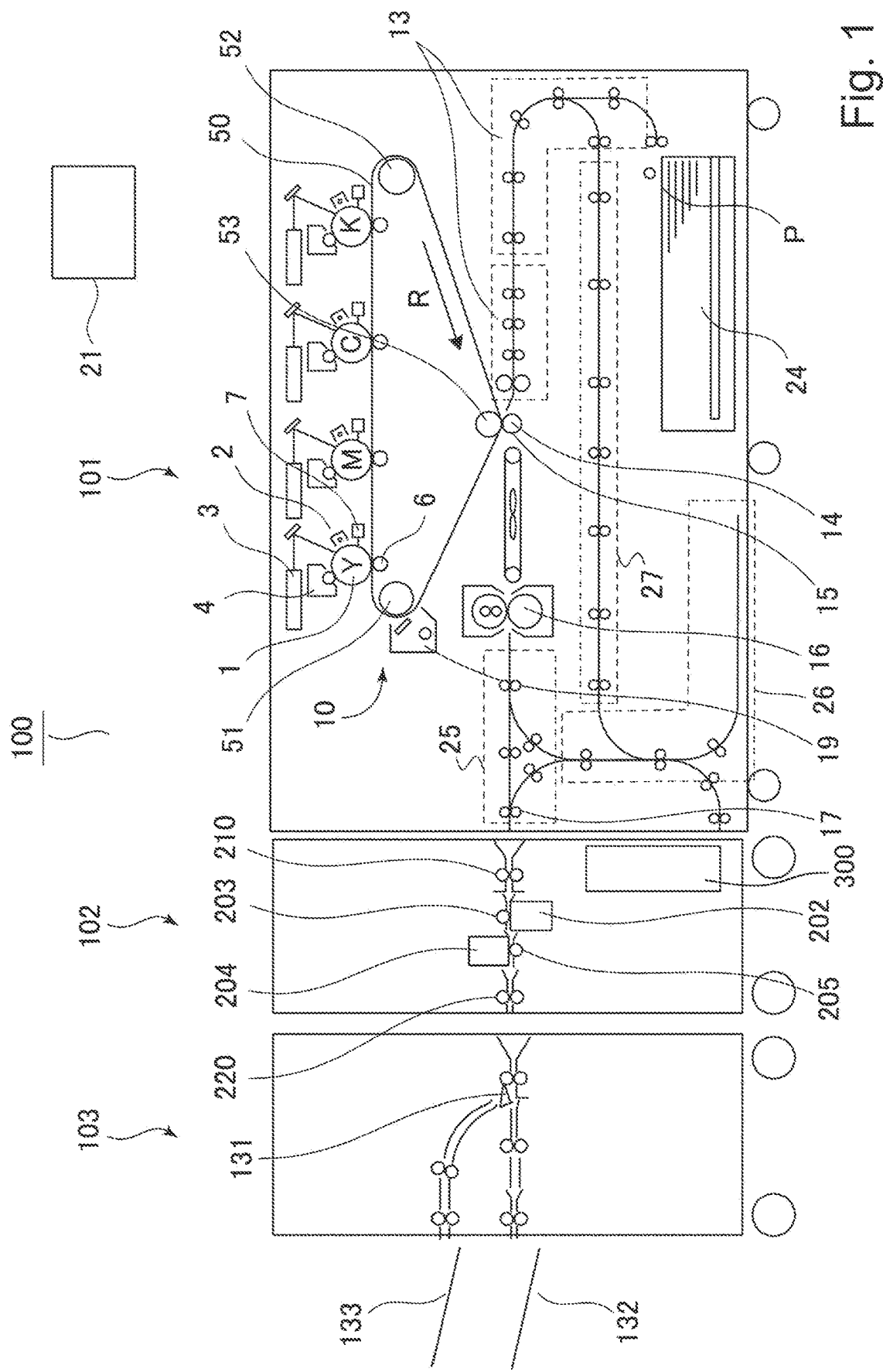
FIG. 1 is a schematic view of the image forming apparatus according to a first embodiment.

FIG. 1 is a schematic view showing an image forming system 100 as an image forming apparatus according to a first embodiment. The image forming system 100 is provided with a configuration in which an inspection device 102 and a sorting device 103 are connected in a downstream of a printer 101 as a main assembly of an image forming apparatus with an image forming function.

The printer 101 is a full color printer which is provided with an image forming mechanism 10 which forms an image on a recording material P by an electrophotographic process by using four color toners. The printer 101 forms an image on the recording material P which is based on image information which is input to a control portion from an external device including information terminal such as a personal computer or an image reader (not shown). It is possible to use a variety of sheets of different sizes and materials, including plain paper and cardboard, plastic film, cloth, surface treated sheet material such as coated paper, and special shape sheet material such as an envelope and an index paper, as a sheet material P.

Further, the printer 101 is provided with a feeding and conveying portion 13, a branching and discharging portion 25, a reversing portion 26, and a re-feeding portion 27. Furthermore, the printer 101 is provided with an operating portion 21, which is a user interface for the image forming system 100. The user can input setting information and give an execution instruction to the image forming apparatus 100 by operating a touch panel, etc. of the operating portion 21 or an external device which is connected to the image forming system 100.

The image forming mechanism 10 includes four image forming units PY, PM, PC and PK (a process unit, an image forming station) which form toner images in yellow, magenta, cyan and black, respectively. Each of the image forming units from PY to PK is provided with a photosensitive drum 1 as an image bearing member (an electrophotographic photosensitive member), a charging device 2, a laser scanner 3, a developing device 4, a primary transfer roller 6, and a drum cleaner 7.

The four image forming units from PY to PK are arranged along an intermediary transfer belt 50 as an intermediary transfer member. The intermediary transfer belt 50 is stretched over a driving roller 51, a tension roller 52 and a secondary transfer inner roller 53, and is fed and driven in a direction of an arrow R in the figure. A secondary transfer roller 14 as a transfer member is arranged at a position opposed to the secondary transfer inner roller 53 across the intermediary transfer belt 50. The secondary transfer portion 15, which is a transfer portion in the embodiment in which an image (a toner image) is transferred to the recording material P, is a nip portion between the secondary transfer roller 14 and the intermediary transfer belt 50. Further, a belt cleaner 19 is arranged at a position opposed to the intermediary transfer belt 50.

When the printer 101 receives an instruction to start an image forming operation, the photosensitive drum 1 of each image forming unit from PY to PK and the intermediary transfer belt 50 are started to drive. The charging device 2 uniformly charges a surface of the photosensitive drum 1. The laser scanner 3 emits laser light which is modulated based on an image signal (a video signal) which is generated from image information onto the surface of the photosensitive drum 1 and writes an electrostatic latent image on the surface of the photosensitive drum 1. The developing device 4 develops the electrostatic latent image by using any of yellow, magenta, cyan or black toner. Thus, a monochromatic toner image is formed on the surface of each photosensitive drum 1.

The monochromatic toner image which is borne on four of the photosensitive drums 1 are primary transferred to the intermediary transfer belt 50 by the primary transfer roller 6. At this time, when the toner images of each color are transferred multiply so that they are overlapped each other, a full color image is formed on the surface of the intermediary transfer belt 50. While the full color image is borne on the intermediary transfer belt 50, the full color image is fed toward the secondary transfer portions 15. Incidentally, adhered material such as remaining transfer toner, which is not transferred to the intermediary transfer belt 50 and is remained on the surface of the photosensitive drum 1, is removed by the drum cleaner 7.

In parallel with a toner image forming process as described above in the image forming mechanism 10, the recording material P is supplied one sheet by one sheet from a cassette 24 toward the secondary transfer section 15 by the feeding and conveying portion 13. The cassette 24 is an accommodating container in which a number of recording materials P are accommodated. The feeding and conveying portion 13 includes a feeding unit which feeds the recording material P which is accommodated in the cassette 24 while separating one sheet by one sheet, and a plurality of conveyance units which are arranged along a recording material conveyance passage from the cassette 24 to the secondary transfer portion 15. The plurality of conveyance units include a registration roller pair which controls a conveying timing of the recording material P to synchronize with the toner image forming process by the image forming mechanism 10 while correcting for skewness of the recording material P.

When the recording material P reaches the secondary transfer portion 15, a predetermined voltage is applied to the secondary transfer roller 14 and the full color image on the intermediary transfer belt 50 is transferred (secondary transfer) to the recording material P. Incidentally, adhered material such as remaining transfer toner, which is not transferred to the recording material P and is remained on the surface of the intermediary transfer belt 50, is removed by the belt cleaner 19.

The recording material P which has passed through the secondary transfer portion 15 is introduced into a fixing device 16 of a heat fixing method. The fixing device 16 includes a pair of rotatable members such as a pair of rollers which nip and convey the recording material P, and heating means such as a halogen lamp for heating the image on the recording material P which passes through a nip portion (fixing nip) of the pair of rotatable members. The toner is melted by being heated and pressurized as it passes through the fixing nip, then it is fixed, and a fixed image which is fixed to the recording material P is obtained.

In a case of single-sided printing, the recording material Pwhich has passed through the fixing device 16 is discharged from the printer 101 by a discharging roller pair 17 in the branching and discharging portion 25 and delivered to the inspection device 102. In a case of double-sided printing, the recording material P, which has passed through the fixing device 16 while image is formed on the surface of the recording material P, is fed to the reversing portion 26 through a passage which is branched in the branching and discharging portion 25. Subsequently, the recording material P is reversed and fed (switched back) in the reversing portion 26 and fed again to the image forming mechanism 10 through the re-feeding portion 27 and the feeding and conveying portion 13. Then, the recording material P, in which the image is formed on a back side while passing through the secondary transfer portion 15 and the fixing device 16, is discharged from the printer 101 by the discharging roller pair 17 and delivered to the inspection device 102.

The inspection device 102 is arranged between the printer 101 which is an upstream device and the downstream device and the sorting device 103 which is a downstream device. When the image forming apparatus 100 is viewed from a front (a viewpoint in FIG. 1), the inspection device 102 is arranged between the printer 101 and the sorting device 103 in a horizontal direction.

The inspection device 102 includes reading units 202 and 204 which read image information from the recording material (sheet), and is a device which detects whether or not there is any defects in an image on the recording material P which is delivered from the printer 101 based on the read image information. For example, the recording material P in which baseline image is recorded is firstly passed through the inspection device 102, and the image information in which the reading units 202 and 204 read is registered as a reference image in a control portion 300. After that, the image information of the recording material P (the recording material P which is an inspection object) which is fed from the printer 101 is read by the reading units 202 and 204 and transmitted to the control portion 300. The control portion 300 as a determination portion compares the read image information with the registered reference image. In a case that a difference which exceeds an acceptable range (for example, a difference in density, positional shift of a feature point, etc.) is detected, the control portion 300 determines that there is a defect in the image on that recording material P.

The recording material P which is discharged from the inspection device 102 is delivered to the sorting device 103. The sorting device 103 switches a discharge destination of the recording material P according to a result of determining whether or not there is a defect in the image by using the inspection device 102. Specifically, a switching guide 131 switches discharging passages of the recording material P so that the recording material P which is determined that there is no defect is discharged to a lower discharging tray 132 and the recording material P which is determined that there is a defect discharged to an upper discharging tray 133. As described above, a series of image forming operations in the image forming system 100 is completed.

Incidentally, in the embodiment, a configuration which is provided with the image forming mechanism 10 of the intermediary transfer method as an image forming unit is described, however, an image forming mechanism of a direct transfer method which transfers a toner image directly to a recording material from an image bearing member without an intermediary transfer member may be used. Further, mechanisms other than electrophotographic methods, such as an image forming unit of inkjet method and an offset printing mechanism, may be used as an image forming unit.

Further, a configuration of the image forming apparatus 100 which is shown in FIG. 1 is an example, for example, a sheet processing device (finisher) which performs sheet process such as binding and punching on the material P may be arranged instead of the sorting device 103. Further, the inspection device 102 may be provided with a discharging tray so that the inspection device 102 discharges the recording material P as a deliverable.

(Inspection Device)

Figure 2:
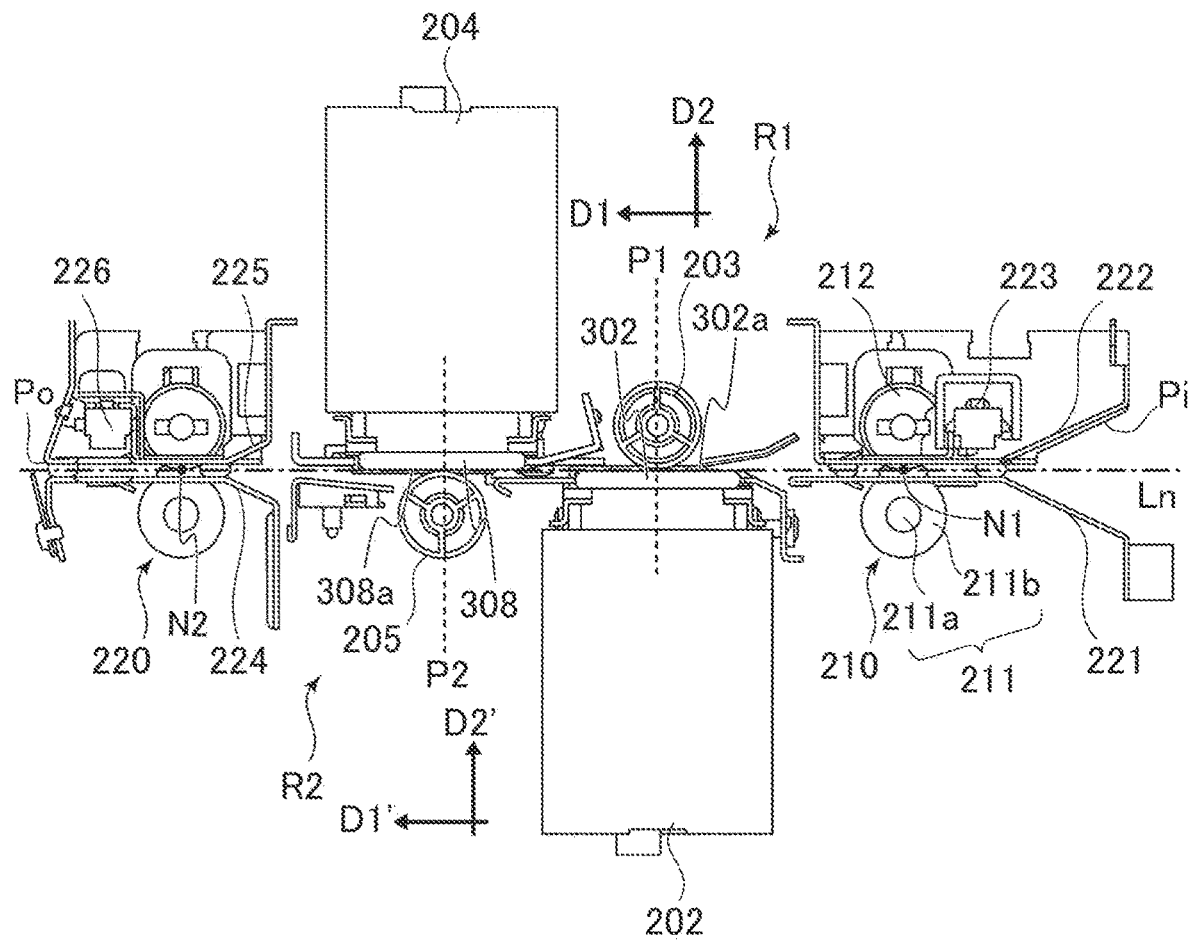
FIG. 2 is a schematic view showing an interior of an inspection device according to the first embodiment.

Next, an internal configuration of the inspection device 102 as an image reading device according to the embodiment will be described. FIG. 2 is a sectional view showing the internal configuration of the inspection device 102.

As described above, the inspection device 102 is arranged between the printer 101 and the sorting device 103 in a horizontal direction (FIG. 1), and the recording material which is delivered from the printer 101 is fed toward the sorting device 103. Thus, the recording material conveyance passage of the inspection device 102 extends from an inlet Pi which opens on a side surface of one side of the inspection device 102 in the horizontal direction (right side in the figure), to an outlet Po which opens on a side surface of the other side of the inspection device 102 (left side in the figure). In particular, in the embodiment, a configuration, in which the recording material conveyance passage inside the inspection device 102 extends in a straight line in the substantially horizontal direction when viewed from the front side, is applied.

As shown in FIG. 2, the inspection device 102 includes a conveyance roller pair 210 (an inlet roller pair), a reading unit 202 (a first reading unit), a reading glass 302 (a first reading glass) and a pressing roller (a platen roller) 203. Further, the inspection device 102 includes a reading unit 204 (a second reading unit), a reading glass 308 (a second reading unit), a pressing roller (a platen roller) 205 and a conveyance roller pair 220 (an outlet roller pair). Furthermore, the inspection device 102 includes a plurality of conveyance guides (221, 222, 224 and 225) which form the recording material conveyance passage, and an inlet sensor 223 and an outlet sensor 226 as detection units which detect the recording material which is fed through the recording material conveyance passage.

The reading unit 202, the reading glass 302 and the pressing roller 203 configures a first reading portion R1 which reads image information from a first side of the recording material. The reading unit 204, the reading glass 308 and the pressing roller 205 configures a second reading portion R2 which reads image information from a second side of the recording material.

In a following description, a recording material conveyance direction D1 refers to a direction of movement of the recording material at a reading position P1 of the reading unit 202. A vertical direction D2 refers to a direction which is perpendicular to a sheet passing surface 302a of the reading glass 302 (a height direction with respect to the reading glass 302). In other words, the vertical direction D2 is a direction which is perpendicular to both the recording material conveyance direction D1 and a sheet width direction at a reading position P1 of the reading unit 202. The vertical direction D2 is also a direction of depth of field of the reading unit 202. The sheet width direction is a direction which is perpendicular to the recording material conveyance direction D1. The sheet width direction is also a direction of a rotational axis of the conveyance roller pairs 210 and 220 and a direction of a main scanning of the reading units 202 and 204.

In the embodiment, a recording material conveyance direction D1', which is a direction of movement of the recording material at a reading position P2 of the reading unit 204, is substantially same as the recording material conveyance direction D1 which is described above. Further, a vertical direction D2', which is perpendicular to a paper passing surface 308a of the reading glass 308, is substantially same as the vertical direction D2 which is described above. For simplicity, a configuration around the reading unit 204 will be also described below, by using the recording material conveyance direction D1 and the vertical direction D2. However, in such a case that the recording material conveyance passage is bent between the reading positions P1 and P2 of the two reading units 202 and 204, the record material conveyance direction D1' and the vertical direction D2' at the reading position P2 may not correspond to the record material conveyance direction D1 and the vertical direction D2 which are described above. In that case, a configuration of the second reading portion R2 is based on the recording material conveyance direction D1' and the vertical direction D2' instead of the recording material conveyance direction D1 and the vertical direction D2 as a standard.

The reading unit 202 is a reading unit (a first reading unit) which reads image information through the reading glass 302 as a transparent member (a first transparent member)

from a first surface (a surface of lower side in the figure) of the recording material which is fed along the recording material conveyance passage. The reading unit 204 is a reading unit (a second reading unit) which reads image information through the reading glass 308 as a transparent member (a second transparent member) from a second surface (a surface of upper side in the figure) which is an opposite side of the first surface of the recording material which is fed along the recording material conveyance passage.

Contact image sensors (CIS) are used for the reading units 202 and 204. That is, the reading units 202 and 204 include a light source which emits light toward the recording material which passes through the reading positions P1 and P2, a sensor board in which imaging elements (light receiving elements) are arrayed in the sheet width direction, and a lens which forms an image of reflected light from the recording material on a light receiving surface of the imaging element. As the light source, for example, an LED on the sensor board and a light guide member which emits light from the LED onto the recording material while diffusing it uniformly in the sheet width direction. The sensor board of the reading unit 202 is opposed to a back of the reading glass 302 in the vertical direction D2 at the reading position P1, and the sensor board of the reading unit 204 is opposed to a back of the reading glass 308 in the vertical direction D2 at the reading position P2. The reading units 202 and 204 optically scan the surface of the recording material at the reading positions P1 and P2, and acquire image information from the recording material by photoelectrically converting an optical image entering through the reading glasses 302 and 308 by means of the imaging element.

Incidentally, as the reading units 202 and 204, a configuration of a CCD method which uses a charge coupled device as an imaging element and forms image of reflected light from the recording material with a reduction optical system which uses a plurality of mirrors. In a case that the reading units 202 and 204 applies the CIS method, it is advantageous in terms of cost and miniaturization compared to the CCD method, however, a positional accuracy of the recording material in the vertical direction D2 is important to ensure a reading accuracy because of a shallow depth of field.

The reading glass 302 is arranged at the reading position P1, and is opposed to the pressing roller 203 which is an opposing member in the vertical direction D2 across a space (a gap) through which the recording material passes. The reading glass 302 includes the sheet passing surface 302a which extends in the recording material conveyance direction D1 and the sheet width direction on a surface of the pressing roller 203 side (a side of space through which the recording material passes) in the vertical direction D2. A position of the sheet passing surface 302a of the reading glass 302 in the vertical direction D2, is set to match a focal point of the reading unit 202.

The reading glass 308 is arranged at the reading position P2, and is opposed to the pressing roller 205 which is an opposing member in the vertical direction D2 across a space (a gap) through which the recording material passes. The reading glass 308 includes the sheet passing surface 308a which extends in the recording material conveyance direction D2 and the sheet width direction on a surface of the pressing roller 205 side (a side of space through which the recording material passes) in the vertical direction D2. A position of the sheet passing surface 308a of the reading glass 302 in the vertical direction D2, is set to match a focal point of the reading unit 204.

The conveyance roller pair 210 in an upstream side is arranged upstream of the reading position P1 of the reading unit 202 with respect to the recording material conveyance direction D1, and conveys the recording material which is fed into the recording material conveyance passage through the inlet Pi toward the reading position P1. The conveyance roller pair 220 in a downstream side is arranged downstream of the reading position P2 of the reading unit 204 with respect to the recording material conveyance direction D1, and conveys the recording material which is fed into the recording material conveyance passage through the outlet Po toward the reading position P2.

The conveyance roller pairs 210 and 220 are examples of the conveyance units which convey the sheet which is read through the reading position P1 of the reading unit 202. The conveyance roller pair 210 is an example of a first roller pair which is arranged upstream of the reading position P1 with respect to the sheet conveyance direction, and the conveyance roller pair 220 is an example of a second roller pair which is arranged downstream of the reading position P1 with respect to the sheet conveyance direction. Incidentally, two of the reading units 202 and 204 are adjacent to each other in the embodiment, however, another conveyance roller pair (hereinafter referred to as "intermediary roller pair") may be arranged between the reading units 202 and 204 with respect to the recording material conveyance direction D1. In a case of a configuration which includes an intermediary roller pair, a nip line for the first reading portion R1 is a straight line which passes through a nip portion between the conveyance roller pair 210 and the intermediary roller pair and a nip line for the second reading portion R2 is a straight line which passes through a nip portion between the intermediary roller pair and the conveyance roller pair 220.

The conveyance roller pair 210 in the upstream side is configured of a driving roller 211 and a roller 212 which is a driven roller which rotates in accordance with the driving roller 211. The driving roller 211 configures of a steel shaft 211a, which extends in the sheet width direction, to which two of silicon rubber outer peripheral portions 211b (a recording material contact portion, a roller main body) whose outer diameters are 20 mm are attached. The roller 212 is provided at a position corresponding to the outer peripheral portion 211b of the driving roller 211 with respect to the sheet width direction and is made of POM (polyacetal resin). A shaft portion of the roller 212 is rotationally supported by a frame of the inspection device 102, and the roller 212 is urged against the driving roller 211 by an unshown spring member with an urging force of 10N in total. When the driving roller 211 is rotationally driven by power of an unshown motor, the conveyance roller pair 210 nips and conveys the recording material to the nip portion N1 between the driving roller 211 and the roller 212.

A configuration of the conveyance roller pair 220 in the downstream side is substantially same as a configuration of the conveyance roller pair 210 in the upstream side. That is, the conveyance roller pair 220 includes the driving roller and the roller which is a driven roller which rotates in accordance with the driving roller, and nips and conveys the recording material at the nip portion N2 between the driving roller and the roller.

Hereafter, when viewed in the sheet width direction, a virtual strait line which passes through the nip portions N1 and N2 of the conveyance roller pairs 210 and 220 in the upstream side and the downstream side is a nip line Ln. In the embodiment, a direction of the nip line Ln is substantially parallel to the recording material conveyance direction D1.

Of a plurality of conveyance guides which are provided with the inspection device 102, an inlet guide lower 221 and an inlet guide upper 222 extend from a downstream side of the nip portion N1 of the conveyance roller pair 210 to an upstream side of the nip portion N1 with respect to the recording material conveyance direction D1 and form an inlet Pi of the recording material conveyance passage. In the upstream side of the nip portion N1, the inlet guide lower 221 and the inlet guide upper 222 are inclined with respect to the recording material conveyance direction D1 so that the inlet guide lower 221 and the inlet guide upper 222 are away each other with respect to the vertical direction D2 toward the upstream of the recording material conveyance direction D1 (that is, so that a width of the inlet Pi is widened).

Further, of a plurality of conveyance guides which are provided with the inspection device 102, an outlet guide lower 224 and an outlet guide upper 225 extend from an upstream side of the nip portion N2 of the conveyance roller pair 220 to a downstream side of the nip portion N2 with respect to the recording material conveyance direction D1 and form an outlet Po of the recording material conveyance passage. In the upstream side of the nip portion N2, the outlet guide lower 224 and the outlet guide upper 225 are inclined with respect to the recording material conveyance direction D1 so that the outlet guide lower 224 and the outlet guide upper 225 are away each other with respect to the vertical direction D2 toward the upstream of the recording material conveyance direction D1.

Between the inlet guide lower 221 and the inlet guide upper 222 and between the outlet guide lower 224 and the outlet guide upper 225 with respect to the vertical direction D2, the recording material conveyance passage is formed as a space through which the recording material passes. Further, the recording material conveyance passage is formed between the reading glass 302 and the pressing roller 203 and between the reading glass 308 and the pressing roller 205 with respect to the vertical direction D2.

It is possible to use SUS420CP (martensitic stainless steel) as a material for the inlet guide lower 221, the inlet guide upper 222, the outlet guide lower 224 and the outlet guide upper 225. Further, it is preferable that a contact surface with the recording material is polished, the surface smoothness is increased and the recording material is prevented to be scratched.

In the embodiment, at least the recording material conveyance passage from the conveyance roller pair 210 which is arranged in an upstream side to the conveyance roller pair 220 with respect to the reading positions P1 and P2 is a straight passage which extends in a straight line when viewed in the sheet width direction. In other words, the conveyance guides (221, 222, 224 and 225) which form the recording material conveyance passage, the reading glasses 302 and 308, the pressing rollers 203 and 205, etc. are basically arranged along the nip line Ln without intruding (crossing) the nip line Ln. Thus, it is possible to convey the recording material which passes through the reading positions P1 and P2 while maintaining to extend in a strait (a flat) shape along the nip line Ln as viewed in the sheet width direction.

Incidentally, it is possible to arrange so that one of the conveyance guides, the reading glasses 302 and 308, and pressing rollers 203 and 205 intrudes slightly with respect to the nip line Ln. In such cases, it is preferable that an amount of intrusion is small enough (for example, 5 mm or less, preferably 1 mm or less, in the vertical direction D2) so that the recording material is close to a state of extending in a strait (a flat) shape. Further, in the embodiment, the sheet passing surfaces 302a and 308a of the reading glasses 302 and 308 are extending substantially parallel to the nip line Ln, however, the sheet passing surfaces 302a and 308a may be slightly inclined closer to the nip line Ln toward the downstream with respect to the recording material conveyance direction D1.

The inlet sensor 223 is arranged upstream of the conveyance roller pair 210 with respect to the recording material conveyance direction D1. The outlet sensor 226 is arranged downstream of the conveyance roller pair 220 with respect to the recording material conveyance direction D1. As for the inlet sensor 223 and the outlet sensor 226, it is possible to use a known sensor configuration which is capable of detecting a sheet-like recording material. For example, it is possible to use a photoelectric sensor (a photo reflector) which emits light toward the recording material conveyance passage and detects the reflected light from the recording material. Further, it may be a configuration that a photoelectric sensor (a photo interrupter) in which light is shielded by a flag member detects that the flag member which is protruding into the recording material conveyance passage is pressed and oscillated by the recording material.

(Operation of the Inspection Device)

A series of operations in which the inspection device 102 reads image information while conveying the recording material will be described. The recording material P which enters into the recording material conveyance passage through the inlet Pi is guided to the nip portion N1 of the conveyance roller pair 210 by the inlet guide lower 221 and the inlet guide upper 222 which are tapered, while suppressing flapping (positional deviation) in the vertical direction D2. In the process, the control unit 300 of the inspection device 102 recognizes that the recording material is fed from the printer 101 when a leading end of the recording material is detected by the inlet sensor 223.

The control portion 300 of the inspection portion 102 determines a timing when the reading units 202 and 204 start reading image information based on a detection timing of the inlet sensor 223. Further, a conveyance defect (jam) of the recording material is detected based on a detection result of the inlet sensor 223, such as a case that the inlet sensor 223 does not detect the recording material before a predetermined time based on a conveyance information of the recording material which is notified by the printer 101 is elapsed.

The recording material which arrives at the conveyance roller pair 210 is fed along the sheet passing surfaces 302a and 308a of the reading glasses 302 and 308. Meanwhile, image information on the first side of the recording material is read by the reading unit 202 when the recording material passes through the reading position P1, and image information on the second side of the recording material is read by the reading unit 204 when the recording material passes through the reading position P2. That is, the inspection device 102 is capable of reading image information from both sides of the recording material while the recording material passes through the recording material conveyance passage only once without a reverse conveyance of the recording material, etc. Here, a conveyance speed of the recording material P which is discharged from the printer 101 is substantially same as a conveyance speed of the recording material P in the inspection device 102.

The recording material which has passed through the reading position P2 of the reading unit 204 in the downstream side is guided to the nip portion N2 of the conveyance roller pair by the outlet guide lower 224 and the outlet guide upper 225. And by means of the conveyance roller pair 220, the recording material is discharged through the outlet Po to an outside of the inspection device 102 and delivered to the sorting device 103. In the process, the control portion 300 of the inspection device 102 recognizes that discharge of the recording material is completed when a trailing end of the recording material is detected by the outlet sensor 226. Further, the control portion 300 of the inspection device 102 detects of a conveyance defect (jam) of the recording material based on a detection result of the outlet sensor 226.

By the way, the inspection device 102 is a device which reads image information from a variety of recording materials of different materials, including thin paper with low stiffness and thick paper with high stiffness. In the embodiment, the image information is read, while the recording material is fed in a straight passage which extends in a straight line from the conveyance roller pair 210 in the upstream side of the reading position P1 and P2 to the conveyance roller pair 220 in the downstream side of the reading position P1 and P2. Therefore, it is possible to suppress deviation (flapping) from an ideal position of the recording material with respect to the recording material conveyance direction D1 or the vertical direction D2 by action of unnecessary external force on the recording material while the recording material is fed through the reading positions P1 and P2.

When a conveyance speed of the recording material fluctuates, it leads to magnification fluctuation or geometric fluctuation of a read image, and when a position of the recording material in the vertical direction D2 deviates, accuracy of the read image is decreased (blurred). On the other hand, in the embodiment, a straight passage configuration is applied, and the reading glasses 302 and 308 are arranged in accordance with focal points of the reading units 202 and 204 within a range of the straight passage. Therefore, it is possible to suppress deviation (flapping) from the ideal position of the recording material with respect to the recording material conveyance direction D1 or the vertical direction D2 and read correct image information accurately for the recording materials of different materials.

In the embodiment, in order to further improve accuracy of reading, the sheet passing surfaces 302a and 308a of the reading glasses 302 and 308 are arranged so as to be substantially aligned with the nip line Ln. As a specific example, positions of the sheet passing surfaces 302a and 308a at the reading positions P1 and P2 is preferably located within 3 mm from the nip line Ln with respect to the vertical direction D2, and more preferably located within 1 mm, and may be arranged directly above the nip line Ln. By arranging the reading glasses 302 and 308 in such a position, the recording material P which passes through the reading positions P1 and P2 is straighter and stretched, so it prevents bending of the recorded material P which may lead to a decrease in the accuracy of reading.

Incidentally, around and in the downstream side of the nip portion N1 of the conveyance roller pair 210, it is preferable that the inlet guide lower 221 and the inlet guide upper 222 extend in the recording material conveyance direction D1 in substantially parallel with each other. At the reading positions P1 and P2, it is preferable that the sheet passing surfaces 302a and 308a of the reading glasses 302 and 308 extend in the recording material conveyance direction D1 in substantially parallel with the nip line Ln. Around and in the downstream side of the nip portion N2 of the conveyance roller pair 220, it is preferable that the outlet guide lower 224 and the outlet guide upper 225 extend in the recording material conveyance direction D1 in substantially parallel with each other.

(Details of the First Reading Portion)

Figure 3:
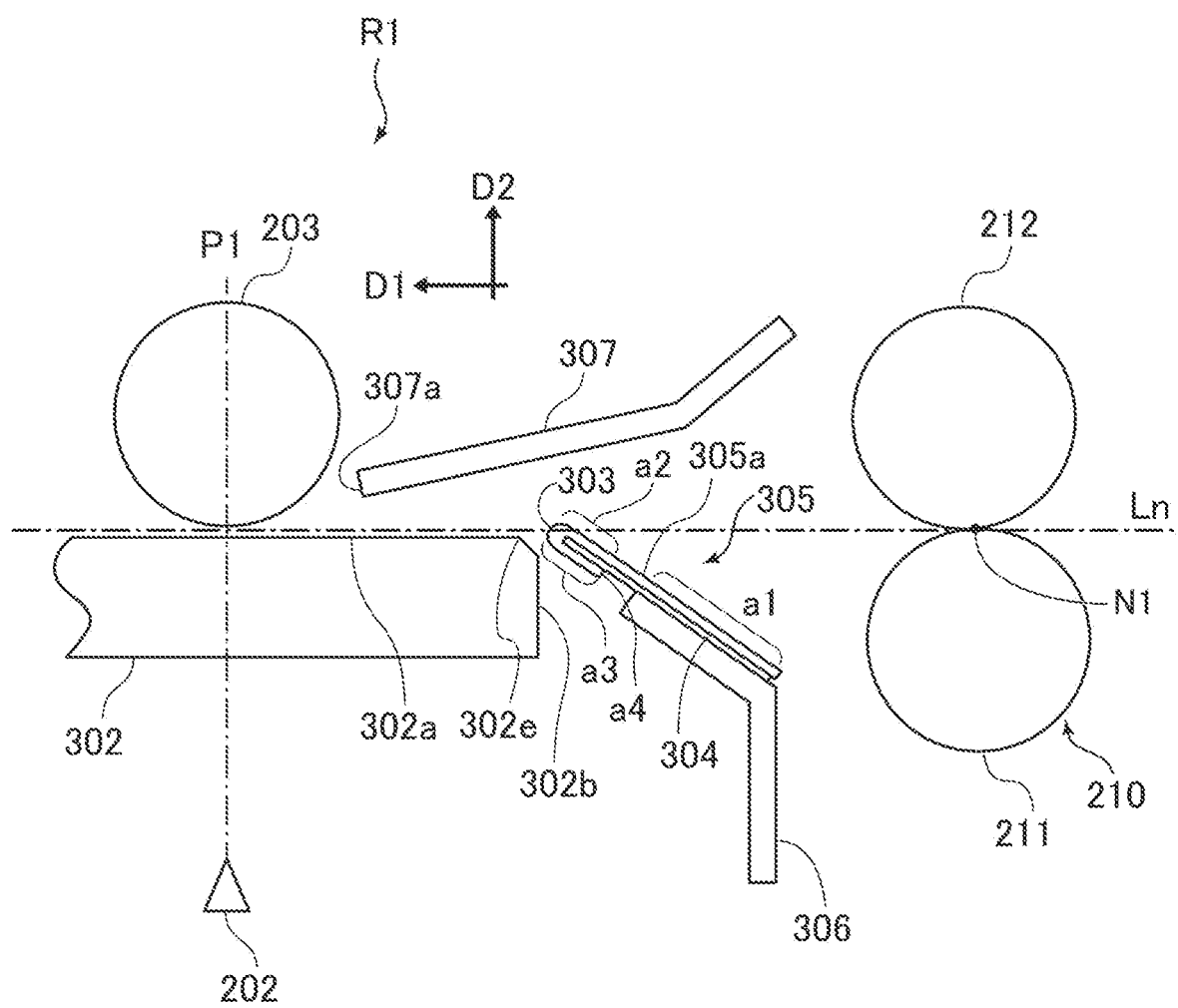
FIG. 3 is a view showing a first reading portion of the inspection device according to the first embodiment.
Figure 4:
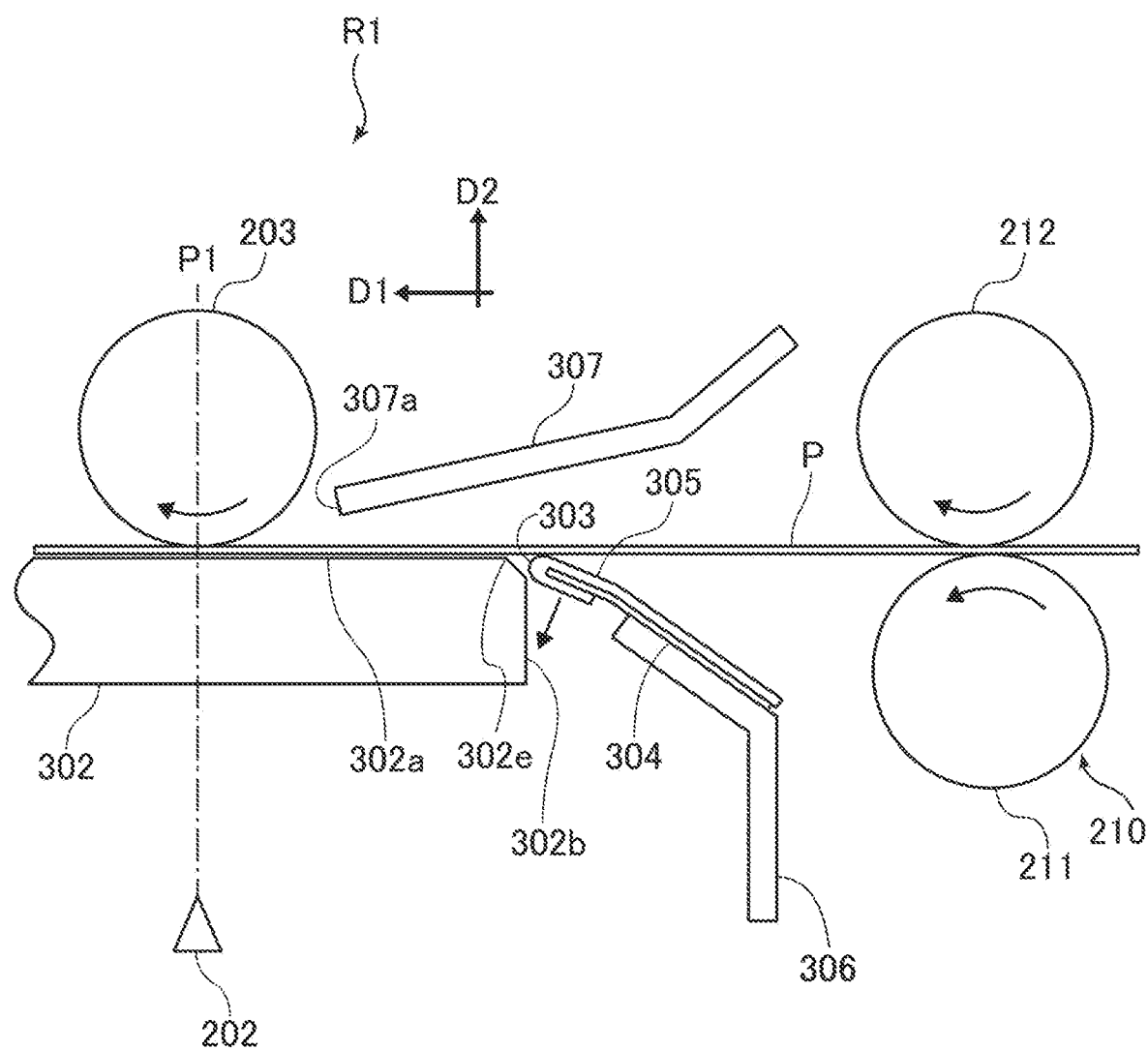
FIG. 4 is a view showing the first reading portion of the inspection device according to the first embodiment.

Next, details of the first reading portion R1 and a guide member 305 which is provided with the first reading portion R1 will be described by using FIG. 3 and FIG. 4. FIG. 3 is a view showing the first reading portion R1 when viewed in the sheet width direction, and FIG. 4 is a view showing the first reading portion R1 while the recording material P passes through the first reading portion R1.

As shown in FIG. 3, the first reading portion R1 is provided with the guide member 305 which is configured of an elastic sheet material 305a (a sheet member, film material, and first sheet material). The guide member 305 is attached to double sided tape 304 on one side of the elastic sheet material 305a, and is adhered to a sheet metal 306 as a support member via a double sided tape 304.

Here, a leading end portion 303 in a downstream side of the guide member 305, is a folded portion in which a part of an area (a3) of the elastic sheet material 305a is folded so that it overlaps the other part of an area (a2). Specifically, the elastic sheet material 305a includes a first area a1 as a supported portion (a base portion) which is supported (fixed) to the sheet metal 306, a second area a2 which extends downstream from the first area a1 with respect to the recording material conveyance direction D1, and a third area a3 which is folded back from the second region a2. The third area a3 extends from a downstream end of the second area a2 with respect to the recording material conveyance direction D1 to an upstream side with respect to the recording material conveyance direction D1, and overlaps the second area a2. Thus, the leading end portion 303 of the guide member 305 in the embodiment is the folded portion in which the third area a3 of the elastic sheet material 305a is folded back so that it overlaps the second area a2.

The third area a3 of the elastic sheet material 305a is adhered to the second area a2 by the double sided tape 304. Therefore, the guide member 305 maintains the shape of the elastic sheet material 305a which is folded back. That is, an end surface a4 of the elastic sheet material 305a is not exposed to the leading end portion 303 of the guide member 305. Therefore, it is possible to suppress generating paper dust as will be described below. Further, the double sided tape 304 has a role to adhere the guide member 305 to the sheet metal 306 and a role to attach the second area a2 of the guide member 305 to the third area a3, so it is possible to reduce costs. Incidentally, the end surface a4 is, for example, a cut surface when the elastic sheet material 311a is cut from an original sheet.

Incidentally, in the elastic sheet material 305a, an area which includes the end surface a4 (the third area a3) is folded back so that it is positioned at a back side of an area which does not include the end surface a4 (the second area a2) when viewed from a side of space through which the recording material passes (upper side in the figure) with respect to the vertical direction D2. That is, the end surface a4 of the elastic sheet material 305a is positioned on an opposite side of space through which the recording material passes across the second area a2 of the elastic sheet material 305a. Thus, it is possible to prevent the recording material from getting caught on the end surface a4 of the elastic sheet material 305a which is fed through the space described above.

Incidentally, the "folded portion" refers to a shape of the leading end portion 303 in a case that the end surface a4 of the elastic sheet material 305a is positioned in upstream side of a downstream end (the leading end portion 303) of the guide member 305 with respect to the recording material conveyance direction D1. That is, in the leading end portion 303 of the guide member 305, at least, the end surface a4 may only be positioned in the upstream side of the downstream end of the guide portion 305 with respect to the recording material conveyance direction D1, and the second area a2 and the third area a3 may not be adhered to each other.

A material of the elastic sheet material 305a is elastic enough to flex when it is pressed by a general recording material. Thus, rigidity of the elastic sheet material 305a is lower than the conveyance guides (221, 222, 224 and 225) which is described above and whose rigidity is high enough that deflection is negligible even when it is pressed by the recording material and an opposing guide 307 which will be described below. As an example, ultrahigh molecular polyethylene film is used for the elastic sheet material 305a.

Incidentally, as the elastic sheet material 305a, it is preferable to use a material whose modulus of elasticity (Young's modulus) is from 0.8 GPa to 1.2 GPa. When its Young's modulus is too low, the guide member 305 may be deformed even by very weak force and may not provide proper guiding action, and when its Young's modulus is too high, contact pressure between the leading end portion 303 of the guide member 305 and the recording material is large and paper dust, etc. is likely to be generated. Further, as the elastic sheet material 305a, it is preferable to use a material whose volume resistivity is $10^3$ Ω-cm to $10^5$ Ω-cm. By setting the volume resistivity in the range as described above, it is easier to perform a function of adsorbing paper dust, etc. on the surface of the guide member 305 since the conductive double sided tape 304 is provided inside the folded elastic sheet material 305a. In the example using the ultrahigh molecular polyethylene film which is described above, the film thickness is 0.1 mm, Young's modulus is 1.0 GPa, and the volume resistivity is $10^4$Ω-cm.

It is preferable that a material of the double sided tape 304 is conductive, such as aluminum foil tape. Further, the thickness is 0.1 mm, for example. The double sided tape 304 is an example of an adhesive layer which is provided on a surface of an inner side at the folded portion of the elastic sheet material 305a, and for example, an adhesive may be applied to one side of the elastic sheet material 305a. Further, for example, an overlapping portion each other while the elastic sheet material 305a is folded may be adhered (fixed) by a method of heat welding, single sided tape, a staple, etc.

The guide member 305 is arranged upstream of the reading position P1 with respect to the recording material conveyance direction D1 and on a same side as the reading glass 302 of space through which the recording material passes with respect to the vertical direction D2. The guide member 305 extends downstream of the first area a1 which is supported by the sheet metal 306 with respect to the recording material conveyance direction D1 and in a side of space through which the recording material passes (upper side in the figure) with respect to the vertical direction D2.

A length of the guide member 305 with respect to the sheet width direction is set equal to or greater than a width of the sheet passing surface 302a of the reading glass 302 with respect to the sheet width direction. While the recording material is not being fed, the guide member 305 is contactlessly arranged by being spaced apart from the reading glass 302 with a predetermined gap (for example, approximately 1 mm). When viewed from an upstream side toward a downstream side with respect to the recording material conveyance direction D1, the guide member 305 covers at least a part (preferably all) of the sheet passing surface 302a of the reading glass 302.

The leading end portion 303 of the guide member 305 protrudes from the sheet passing surface 302a of the reading glass 302 to the side of the space (the upper side in the figure) through which the recording material passes with respect to the vertical direction D2. In particular, the leading end portion 303 of the guide member 305 protrudes to the side of the space through which the recording material passes with respect to the vertical direction D2, at least, from an upstream end 302e of the sheet passing surface 302a which extends in the recording material conveyance direction D1. Incidentally, a tapered shape is provided on the sheet passing surface 302a in an example of a configuration which is shown in the figure, and the upstream end 302e of the sheet passing surface 302a is positioned downstream from a side surface 302b of an upstream side of the reading glass 302 with respect to the recording material conveyance direction D1.

Further, the leading end of the guide member 305 intrudes into the nip line Ln which is described above with respect to the vertical direction D2. That is, the guide member 305 intersects the nip line Ln.

The opposing guide 307 is arranged in a position to which, at least, a part of the guide member 305 is opposed with respect to the vertical direction D2. The opposing guide 307 opposes a surface of an opposite side of a surface with which the guide member 305 of the recording material is contacted, and is a conveyance guide to guide the recording material to a gap between the reading glass 302 and the pressing roller 203. The opposing guide 307 extends downstream of the recording material conveyance direction D1 and so as to approach the nip line Ln with respect to vertical direction D2. The leading end 307a of the opposing guide 307 opposes the sheet passing surface 302a of the reading glass 302 in the vertical direction D2 on the upstream side of the reading position P1 with respect to the recording material conveyance direction D1. Unlike the guide member 305, the opposing guide 307 is rigid enough to ignore deflection even when it is pressed by the recording material, and the leading end 307a of the opposing guide 307 is arranged so that it does not intrude into the nip line Ln. The opposing guide 307 is, for example, made of same stainless steel as the conveyance guides (221, 222, 224 and 225) which are described above.

In a case that the recording material P is fed to the first reading portion R1 as shown in FIG. 4, the recording material P is fed while it contacts with the guide member 305. Here, while the recording material P is not being fed, the leading end portion 303 of the guide member 305 protrudes from the sheet passing surface 302a of the reading glass 302 in the vertical direction D2. Therefore, the recording material P is fed smoothly without getting caught on the edge portion of the upstream end 302e on the sheet passing surface 302a of the reading glass 302 and the side surface 302b on the upstream side of the reading glass 302.

Further, since the guide member 305 is configured of the elastic sheet material 305a, the guide member 305 bends and the leading end portion 303 is retracted to the nip line Ln, when it is pressed by the recording material P. Therefore, it is possible to prevent the surface of the recording material P from rubbing strongly against the leading end portion 303 of the guide member 305.

Furthermore, in the embodiment, the leading end portion 303 of the guide member 305 is configured of the folded portion in which the elastic sheet material 305a is folded back. Therefore, the leading end portion 303 is a more smoothly curved surface than an edge shape of the end surface a4 of the elastic sheet material 305a. Therefore, it is possible to prevent the surface of the recording material P from rubbing strongly against the leading end portion 303 of the guide member 305, and to suppress generation of foreign matters such as paper dust and toner dust (collectively referred to as paper dust, etc.) due to sliding of the leading end portion 303. Thus, in the embodiment, it is possible to suppress an appearance of striped noise in the read image which is caused by adhering paper dust, etc. to the sheet passing surface 302a of the reading glass 302, and to suppress an occurrence of a reading error, for example, by the inspection device 102.

In particular, in the embodiment, the leading end portion 303 of the guide member 305 intrudes into the nip line Ln, and is arranged so that the recording material, which is fed along the nip line Ln, easily slides with the leading end portion 303 of the guide member 305. In such a configuration, it is possible to maintain a guiding function of the guide member 305 and to suppress generation of paper dust, etc. by sliding with the leading end portion 303. Further, even in a case that the sheet passing surface 302a of the reading glass 302 is positioned at a position which is substantially same as the nip line Ln in order to improve reading accuracy, it is possible to suppress generation of paper dust, etc. by sliding with the leading end portion 303 of the guide member 305 which protrudes to the sheet passing surfaced 302a.

Further, in the embodiment, the guide member 305 is formed by adhering with the conductive double sided 304 while the elastic sheet material 305a is folded back. Since the guide member 305 includes a conductive adhesive layer such as conductive double sided tape, when charged particles such as paper dust are attached to the guide member 305, charges move inside the adhesive layer due to electrostatic induction, and charges which negate charges of the particles move to a position which is opposed to the particles. Thus, it is possible to electrostatically adsorb charged particles such as paper dust to the guide member 305 and to suppress accumulating the particles on the sheet passing surface 302a of the reading glass 302.

Further, in the embodiment, a support member which supports the guide member 305 is configured of the conductive sheet metal 306, and the elastic sheet material 305a is adhered to the sheet metal 306 by the conductive double sided tape 304. That is, in the embodiment, at least, a part of the guide member 305 is electrically conductive and is a configuration which is electrically connected to the conductive support member. Due to such a configuration, it is possible to electrostatically adsorb charged particles such as paper dust to the guide member 305, and to suppress accumulating the particles on the sheet passing surface 302a of the reading glass 302. Incidentally, instead of the conductive double sided tape 304, it is also possible to use the elastic sheet material 305a itself as a conductive material. Further, the sheet metal 306 is possible to connect to ground potential through a frame (a metal frame) of the inspection device 102.

Incidentally, in the embodiment, the guide member 305, which is arranged on a same side as the reading glass 302 with respect to the recording material conveyance passage (the space through which the sheet passes) in the vertical direction D2, is formed of the elastic sheet material 305a. A guide member 305 is not limited to this, however, a guide member (for example, the opposing guide 307) on an opposite side of the reading glass 302 with respect to the recording material conveyance passage (the space through which the sheet passes) may be formed of an elastic sheet material, and a leading end portion may be a folded portion of the elastic sheet material. Thus, it is possible to suppress generation of paper dust, etc. at the leading end portion of the guide member. Incidentally, since paper dust, etc. which is generated on a same side as the reading glass 302 more easily adheres to the reading glass 302, it is possible to suppress more effectively adhering paper dust to the reading glass 302 due to a configuration in the embodiment that the guide member 305 is formed of the elastic sheet material 305a.

(Details of the Second Reading Portion)

Figure 5:
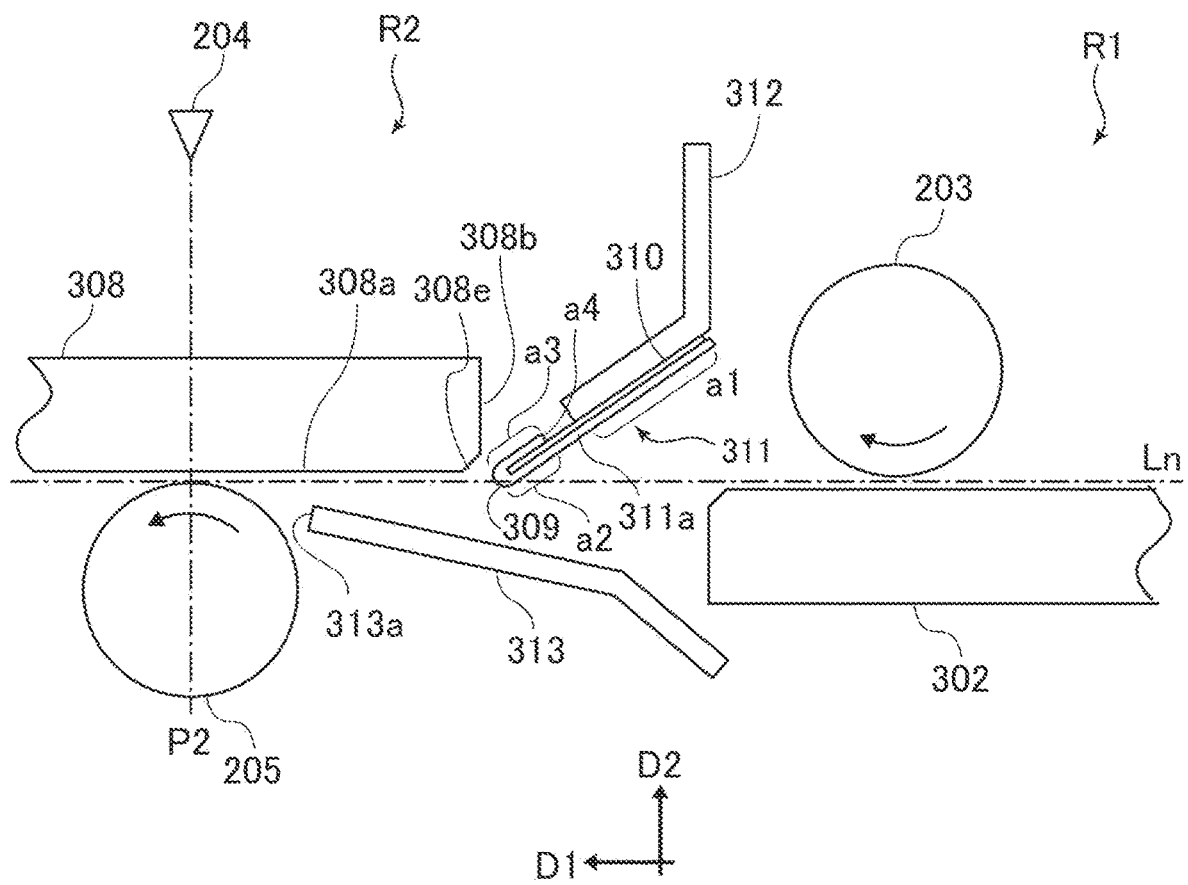
FIG. 5 is a view showing a second reading portion of the inspection device according to the first embodiment.
Figure 6:
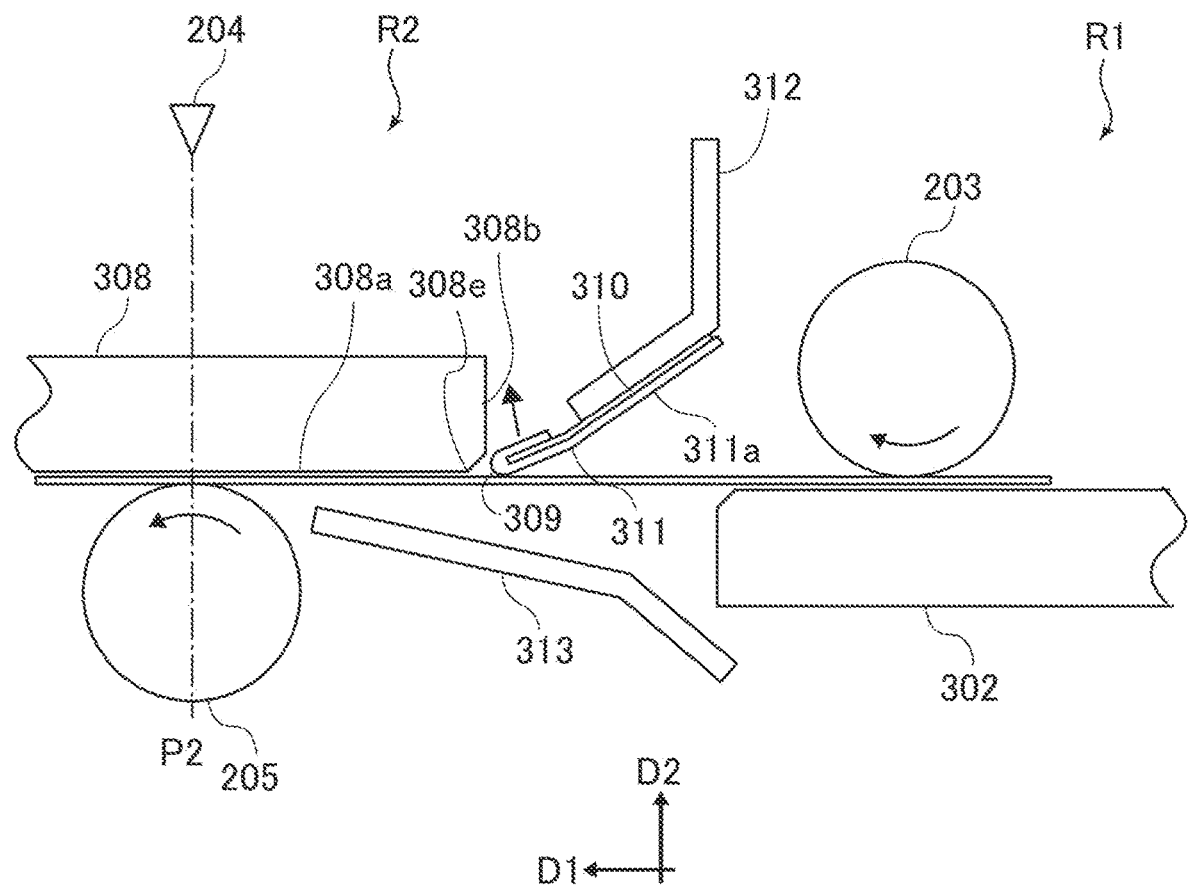
FIG. 6 is a view showing the second reading portion of the inspection device according to the first embodiment.

Next, details of the second reading portion R2 and a guide member 311 which is provided with the second reading portion R2 will be described by using FIG. 5 and FIG. 6. FIG. 5 is a view of the second reading portion R2 when viewed in the sheet width direction, and FIG. 6 is a view showing a state that the recording material P passes through the second reading portion R2. Except that a positional relationship is reversed with respect to the vertical direction, a configuration of the second reading portion R2 is substantially same as that of the first reading portion R1.

As shown in FIG. 6, the second reading portion R2 is provided with the guide member 311 which is configured of an elastic sheet material 311a (a sheet member, film material, and first sheet material). The guide member 311 is attached to double sided tape 310 on one side of the elastic sheet material 311a, and is adhered to a sheet metal 312 as a support member via a double sided tape 310.

Here, a leading end portion 309 of the guide member 311, is a folded portion in which a part of an area (a3) of the elastic sheet material 311a is folded so that it overlaps the other part of an area (a2). Specifically, the elastic sheet material 311a includes a first area a1 as a supported portion (a base portion) which is supported (fixed) to the sheet metal 312, a second area a2 which extends downstream from the first area a1 with respect to the recording material conveyance direction D1, and a third area a3 which is folded back from the second region a2. The third area a3 extends from a downstream end of the second area a2 with respect to the recording material conveyance direction D1 to an upstream side with respect to the recording material conveyance direction D1, and overlaps the second area a2. Thus, the leading end portion 309 of the guide member 311 in the embodiment is the folded portion in which the third area a3 of the elastic sheet material 311a is folded back so that it overlaps the second area a2.

The third area a3 of the elastic sheet material 311a is adhered to the second area a2 by the double sided tape 310. Therefore, the guide member 311 maintains the shape of the elastic sheet material 311a which is folded back. That is, an end surface a4 of the elastic sheet material 311a is not exposed to the leading end portion 309 of the guide member 311. Therefore, it is possible to suppress generating paper dust as will be described below. Further, the double sided tape 310 has a role to adhere the guide member 311 to the sheet metal 312 and a role to attach the second area a2 of the guide member 311 to the third area a3, so it is possible to reduce costs. Incidentally, the end surface a4 is normally a cut surface when the elastic sheet material 311a is cut from an original sheet.

Incidentally, in the elastic sheet material 3 11a, an area which includes the end surface a4 (the third area a3) is folded back so that it is positioned at a back side of an area which does not include the end surface a4 (the second area a2) when viewed from a side of space through which the recording material passes (lower side in the figure) with respect to the vertical direction D2. That is, the end surface a4 of the elastic sheet material 311a is positioned on an opposite side of space through which the recording material passes across the second area a2 of the elastic sheet material 311a. Thus, it is possible to prevent the recording material from getting caught on the end surface a4 of the elastic sheet material 311a which is fed through the space described above.

The elastic sheet material 311a and the double sided tape 310 are possible to use same materials as the elastic sheet material 305a and the double sided tape 304 of the first reading portion R1, however, different materials may be used. As an example, ultrahigh molecular polyethylene film of thickness 0.1 mm, Young's modulus 1.0 GPa and volume resistivity of 10^4 Ω-cm is used for the elastic sheet material 311a. Further, for example, a 0.1 mm thick tape which is made of conductive aluminum foil is used for the double sided tape 310.

The guide member 311 is arranged upstream of the reading position P2 with respect to the recording material conveyance direction D1 and on a same side as the reading glass 308 of space through which the recording material passes with respect to the vertical direction D2. The guide member 311 extends downstream of the first area a1 which is supported by the sheet metal 312 with respect to the recording material conveyance direction D1 and in a side of space through which the recording material passes (upper side in the figure) with respect to the vertical direction D2.

A length of the guide member 311 with respect to the sheet width direction is set equal to or greater than a width of the sheet passing surface 308a of the reading glass 308 with respect to the sheet width direction. While the recording material is not being fed, the guide member 311 is contactlessly arranged by being spaced apart from the reading glass 308 with a predetermined gap (for example, approximately 1 mm). When viewed from an upstream side toward a downstream side with respect to the recording material conveyance direction D1, the guide member 311 covers at least a part (preferably all) of the sheet passing surface 308a of the reading glass 308.

The leading end portion 309 of the guide member 311 protrudes from the sheet passing surface 308a of the reading portion 308 to the side of the space (the lower side in the figure) through which the recording material passes with respect to the vertical direction D2. In particular, the leading end portion 309 of the guide member 311 protrudes to the side of the space through which the recording material passes with respect to the vertical direction D2, at least, from an upstream end 308e of the sheet passing surface 308a which extends in the recording material conveyance direction D1.

Further, the leading end of the guide member 311 intrudes into the nip line Ln which is described above with respect to the vertical direction D2. That is, the guide member 311 intersects the nip line Ln.

The opposing guide 313 is arranged in a position to which, at least, a part of the guide member 311 is opposed with respect to the vertical direction D2. The opposing guide 313 opposes a surface of an opposite side of a surface with which the guide member 311 of the recording material is contacted, and is a conveyance guide to guide the recording material to a gap between the reading glass 308 and the pressing roller 203. The opposing guide 313 extends downstream of the recording material conveyance direction D1 and so as to approach the nip line Ln with respect to vertical direction D2. The leading end 313a of the opposing guide 313 opposes the sheet passing surface 308a of the reading glass 308 in the vertical direction D2 on the upstream side of the reading position P1 with respect to the recording material conveyance direction D1. Unlike the guide member 311, the opposing guide 313 is rigid enough to ignore deflection even when it is pressed by the recording material, and the leading end 313a of the opposing guide 313 is arranged so that it does not intrude into the nip line Ln. The opposing guide 313 is, for example, made of same stainless steel as the conveyance guides (221, 222, 224 and 225) which are described above.

In a case that the recording material P is fed to the second reading portion R2 as shown in FIG. 6, the recording material P is fed while it contacts with the guide member 311. Here, while the recording material P is not being fed, the leading end portion 309 of the guide member 311 protrudes from the sheet passing surface 308a of the reading glass 3 08 in the vertical direction D2. Therefore, the recording material P is fed smoothly without getting caught on the edge portion of the upstream end 308e on the sheet passing surface 308a of the reading glass 308 and the side surface 308b on the upstream side of the reading glass 308.

Further, since the guide member 311 is configured of the elastic sheet material 311a, the guide member 311 bends and the leading end portion 309 is retracted to the nip line Ln, when it is pressed by the recording material P. Therefore, it is possible to prevent the surface of the recording material P from rubbing strongly against the leading end portion 309 of the guide member 311.

Furthermore, in the embodiment, the leading end portion 309 of the guide member 311 is configured of the folded portion in which the elastic sheet material 311a is folded back. Therefore, the leading end portion 309 is a more smoothly curved surface than an edge shape of the end surface a4 of the elastic sheet material 311a. Therefore, it is possible to prevent the surface of the recording material P from rubbing strongly against the leading end portion 309 of the guide member 311, and to suppress generation of paper dust, etc. due to sliding of the leading end portion 309. Thus, in the embodiment, it is possible to suppress an appearance of striped noise in the read image which is caused by adhering paper dust, etc. to the sheet passing surface 308a of the reading glass 308, and to suppress an occurrence of a reading error, for example, by the inspection device 102.

In particular, in the embodiment, the leading end portion 309 of the guide member 311 intrudes into the nip line Ln, and is arranged so that the recording material, which is fed along the nip line Ln, easily slides with the leading end portion 309 of the guide member 311. In such a configuration, it is possible to maintain a guiding function of the guide member 311 and to suppress generation of paper dust, etc. by sliding with the leading end portion 309. Further, even in a case that the sheet passing surface 308a of the reading glass 308 is positioned at a position which is substantially same as the nip line Ln in order to improve reading accuracy, it is possible to suppress generation of paper dust, etc. by sliding with the leading end portion 309 of the guide member 311 which protrudes to the sheet passing surfaced 308a.

Further, in the embodiment, the guide member 311 is formed by adhering with the conductive double sided 310 while the elastic sheet material 311a is folded back. Since the guide member 311 includes a conductive adhesive layer such as conductive double sided tape, when charged particles such as paper dust are attached to the guide member 311, charges move inside the adhesive layer due to electrostatic induction, and charges which negate charges of the particles move to a position which is opposed to the particles. Thus, it is possible to electrostatically adsorb charged particles such as paper dust to the guide member 311 and to suppress accumulating the particles on the sheet passing surface 308a of the reading glass 308.

Further, in the embodiment, a support member which supports the guide member 311 is configured of the conductive sheet metal 312, and the elastic sheet material 311a is adhered to the sheet metal 312 by the conductive double sided tape 310. That is, in the embodiment, at least, a part of the guide member 311 is electrically conductive and is a configuration which is electrically connected to the conductive support member. Due to such a configuration, it is possible to electrostatically adsorb charged particles such as paper dust to the guide member 311, and to suppress accumulating the particles on the sheet passing surface 308a of the reading glass 308. Incidentally, instead of the conductive double sided tape 310, it is also possible to use the elastic sheet material 311a itself as a conductive material. Further, the sheet metal 312 is possible to connect to ground potential through a frame (a metal frame) of the inspection device 102.

(Modified Example)

In the embodiment described above, the elastic sheet materials 305a and 311a are folded back and overlapped only at portions which protrude from the sheet metals 306 and 312 of the guide members 305 and 311. The elastic sheet materials 305a and 311a are not limited to this, however, for example, the entire guide members 305 and 311 may be configured of the elastic sheet materials 305a and 311a which are folded in two. In this case, overlapped portions of the elastic sheet materials 305a and 311a may be adhered (fixed) to the sheet metal 306 and 312 with double sided tape, etc. and the folded portions in two may be the leading end portion 303 and 309 of the guide members 305 and 311.

Further, based on image information which is read by the inspection device 102 after test image is formed by the printer 101, conditions for executing an image forming operation at the printer 101 may be adjusted (for example, correction of image magnification, position correction, color correction, etc.). That is, the image reading device in the embodiment may be an adjustment unit for automatically adjusting the execution conditions of the image forming operation in the image forming system 100.

Second Embodiment

The inspection device 102, which is an example of an image reading device, is described in the first embodiment, however, the present technology can be applied to an image reading device other than inspection devices. As a second embodiment, an example of a configuration in which the present technology is applied to a document reading device which is another example of an image reading device will be described.

Figure 7:
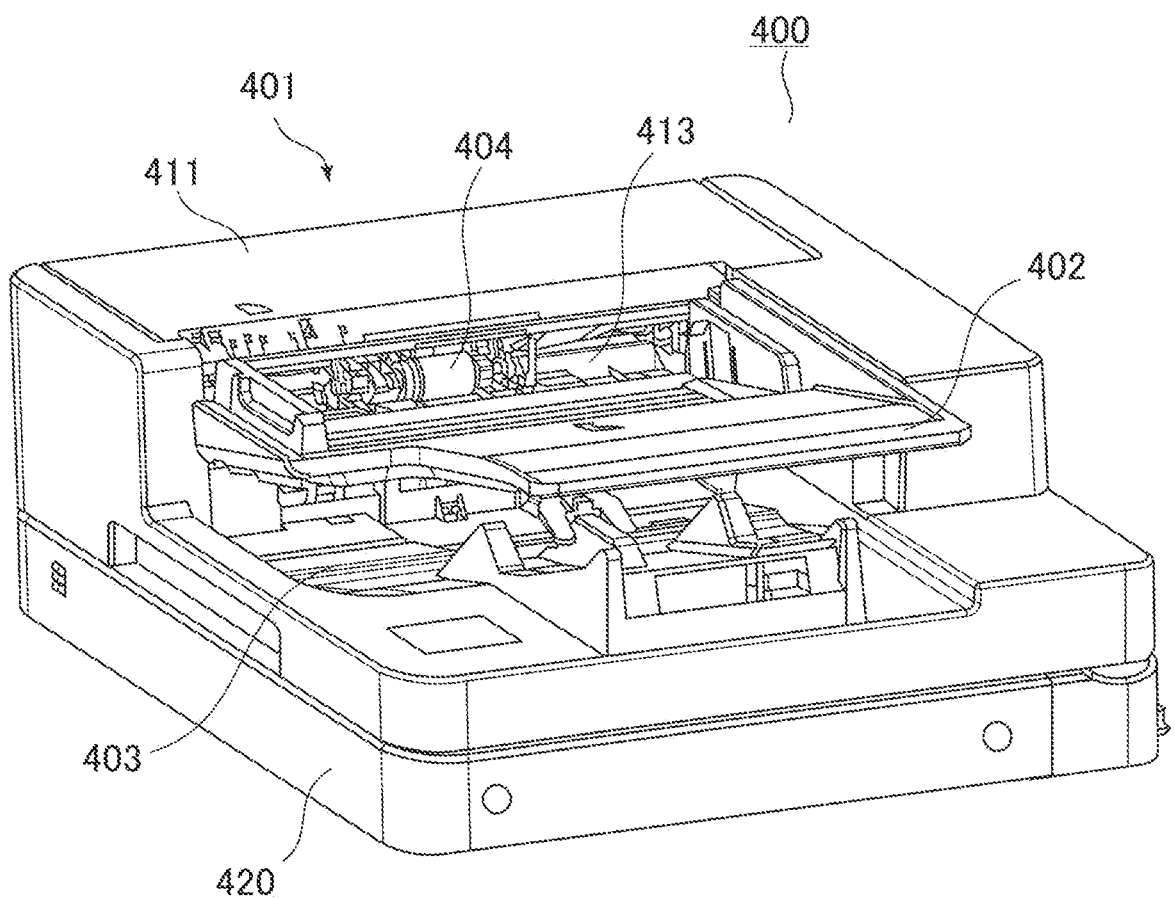
FIG. 7 is a perspective view of a document reading device according to a second embodiment.
Figure 8:
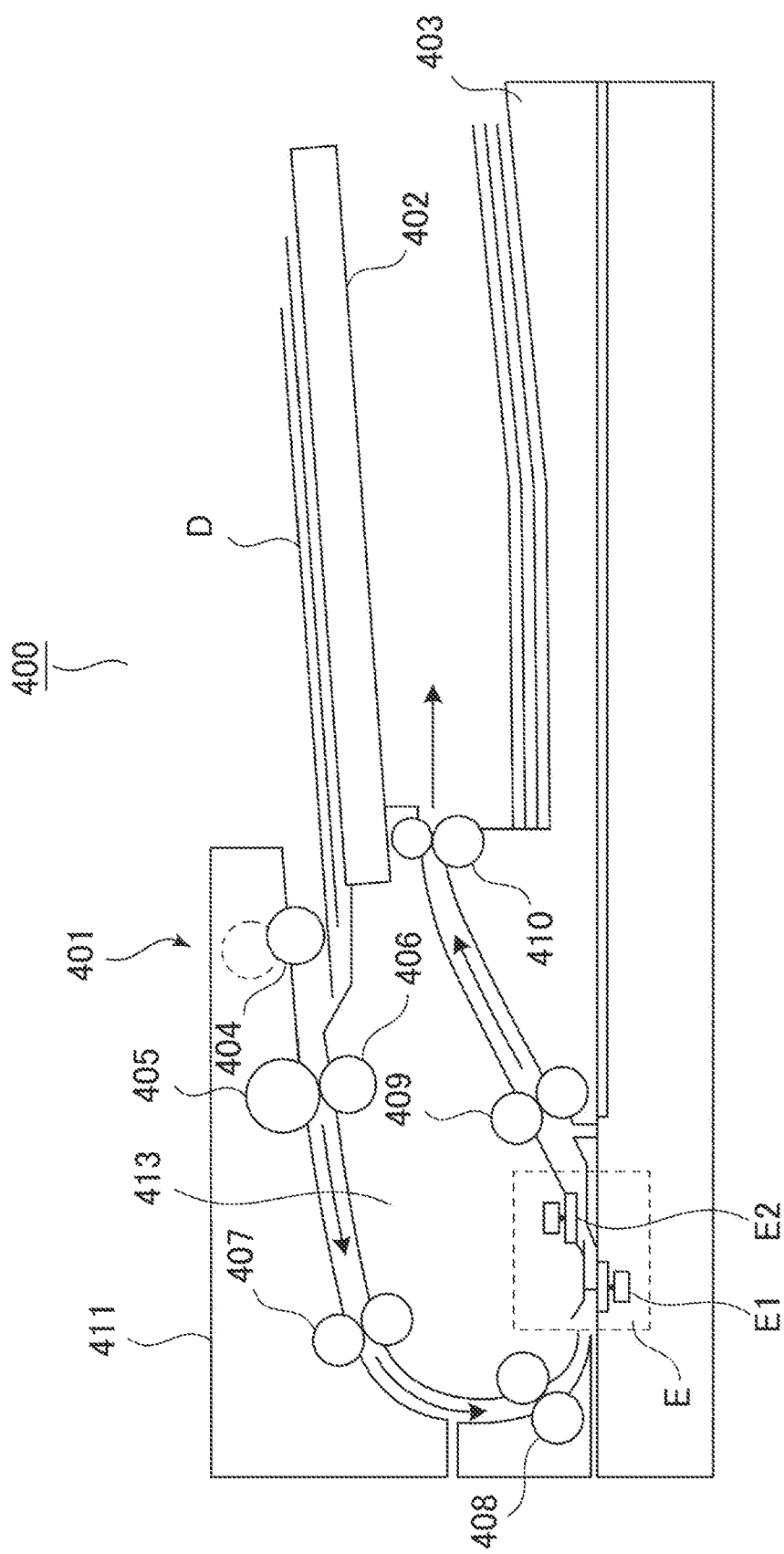
FIG. 8 is a schematic view of the document reading device according to the second embodiment.

FIG. 7 is a perspective view of a document reading device 400 according to the embodiment. FIG. 8 is a schematic view showing a sectional configuration of the document reading device 400. The document reading device 400 is provided with a reader 420 and an ADF 401, and reads image information by optically scanning a document D. "ADF" stands for an Automatic Document Feeder. The document D is a sheet which is paper such as printing paper and an envelope, plastic film such as a sheet for overhead projectors, cloth, etc.

As shown in FIG. 7 and FIG. 8, the document reading device 400 is provided with an image reading portion E which includes a first reading portion E1 which reads image information from a first surface of the document D, and a second reading portion E2 which reads image information from a second surface of the document D. An ADF 401 is provided with a document tray 402, a discharging tray 403, a feeding roller 404, a conveyance roller 405, a separating roller 406, a conveyance roller pairs 408 and 409, a discharging roller pair 410, an inner structure portion 413, and an opening/closing cover 411. The feeding roller 404, the conveyance roller 405, the conveyance roller pairs 407, 408, and 409, and the discharging roller pair 410 function as a conveyance unit which conveys a sheet. The ADF 401 is provided in an openable with respect to a top surface of the reader 420. Further, the opening/closing cover 411 is provided in an openable with respect to the inner structure portion 413, and it is possible to open up a document conveyance passage inside the ADF 401.

A flow of a document reading operation which includes conveyance of feeding, reading, and discharging of the document D will be described by using FIG. 8. The document D which is set in the document tray 402 by a user is fed to the conveyance roller 405 by a rotation of the feeding roller 404 which is a feeding unit. The document D is fed one by one in a separating nip between the conveyance roller 405 and the separating roller 406 which is pressed against the conveyance roller 405 by an urging force of a spring member, etc. The document D which has passed through the separating nip is fed to the image reading portion E by the conveyance roller pairs 407 and 408.

And, while the document D passes through the reading positions of the first reading portion E1 and the second reading portion E2, the first reading portion E1 and the second reading portion E2 read image information from both sides of the document. The document which has passed through the reading positions is delivered to the discharging roller pair 410 via the conveyance roller pair 409, and is discharged to the discharging tray 403 by the discharging roller pair 410.

Figure 9:
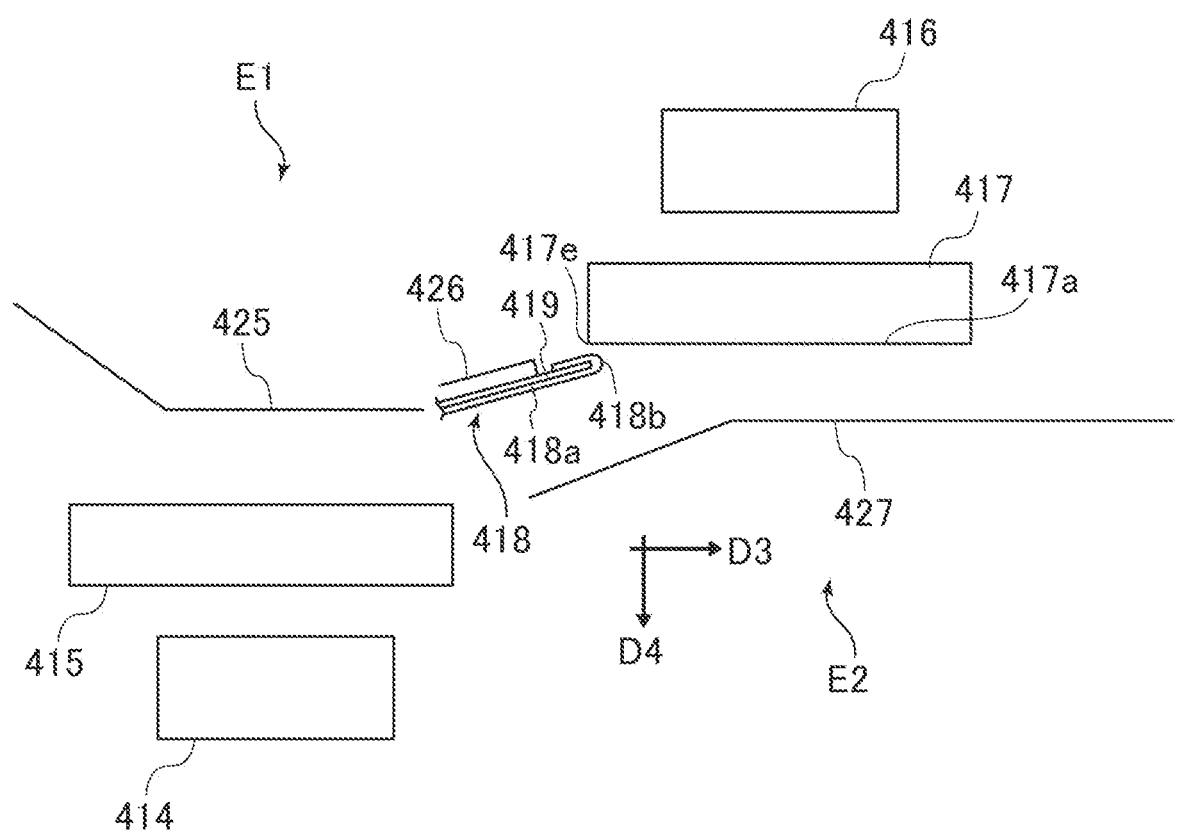
FIG. 9 is a view showing the first reading portion and the second reading portion of the document reading device according to the second embodiment.

FIG. 9 is an enlarged view of the image reading portion E. The first reading portion E1 includes a reading unit 414 of the CIS method, etc., a reading glass 415 which is a transparent member, and an opposing member 425 which opposes the reading glass 415 across a space (gap) through which the document D passes. The second reading portion E2 includes a reading unit 416 of the CIS method, etc., a reading glass 417 which is a transparent member, and an opposing member 427 which opposes the reading glass 417 across a space (gap) through which the document D passes.

The guide member 418 in the embodiment is arranged in an upstream side of the reading glass 417 and in a downstream side of the reading glass 415 with respect to the document conveyance direction D3 at a reading position of the reading unit 416. The guide member 418 is configured of the elastic sheet material 418a and is supported by a support member 426.

The guide member 418 is a folded portion in which a part of an area (a3) of the elastic sheet material 418a is folded so that it overlaps the other part of an area (a2). Double sided tape 419 is attached to a surface of one side of the elastic sheet material 418a and the overlapped areas (a2, a3) are adhered to each other via the double sided tape 419. Further, the guide member 418 is adhered to the support member 426 via the double sided tape 419. It is preferable that the double sided tape 419 and the support member 426 are made of conductive material. For other details of the elastic sheet material 418a and the double sided tape 419, similar materials to those described in the first embodiment may be used.

The guide member 418 extends from the support member 426 toward a downstream side with respect to the document conveyance direction D3, and toward a direction approaching a sheet passing surface 417a with respect to the vertical direction D4 which is perpendicular to the sheet passing surface 417a of the reading glass 417 (upper side in the figure). A leading end portion 418b of the guide member 418 covers an upstream end 417e of the sheet passing surface 417a of the reading glass 417.

Therefore, in a case that the document D is fed from the first reading portion E1 to the second reading portion E2, the document D is guided by the guide member 418 and is fed smoothly without getting caught on the edge portion of the upstream end 417e on the sheet passing surface 417a of the reading glass 417, etc. In the case, since the guide member 418 is configured of the elastic sheet material 418a, the guide member 418 bends when it is pressed by the document D. Therefore, it is possible to prevent the surface of the document D from rubbing strongly against the leading end portion 418b of the guide member 418.

Furthermore, in the embodiment, the leading end portion 418b of the guide member 418 is configured of the folded portion in which the elastic sheet material 418a is folded back. Therefore, the leading end portion 418b is a more smoothly curved surface than an edge shape of the end surface of the elastic sheet material 418a. Therefore, it is possible to prevent the surface of the document D from rubbing strongly against the leading end portion 418b of the guide member 418, and to suppress generation of paper dust, etc. due to sliding of the leading end portion 418b. Thus, in the embodiment, it is also possible to suppress an appearance of striped noise in the read image which is caused by adhering paper dust, etc. to the sheet passing surface 417a of the reading glass 308.

The embodiment, in which the present technology is applied to a document reading device, is described above, however, a same configuration as an internal configuration of the inspection device 102 which is described in the first embodiment may be applied to a document reading device.

Other Embodiments

The present invention is not limited to those described in the embodiments above, however, the present technology may also be applied to an image reading device which reads image information from a sheet. For example, it may also be applied to an image reading device which is built into a main assembly of an image forming apparatus (printer) and reads image information on recording material on which an image is formed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-154346 filed on Sep. 22, 2021, which is hereby incorporated by reference herein in its entirety.

What is claimed is:

1. An image reading apparatus comprising:
a transparent member;
a conveyance unit configured to convey a sheet;
a reading unit configured to read an image information through the transparent member from the sheet conveyed by the conveyance unit; and
a guide member provided upstream of a reading position where the reading unit reads the image information from the sheet with respect to a sheet conveyance direction and configured to guide the sheet to the reading position,
wherein the guide member includes a sheet-like sheet member having elasticity, and
wherein a leading end of a downstream side of the guide member with respect to the sheet conveyance direction is a folded portion formed by folding back the sheet member.

2. An image reading apparatus according to claim 1, wherein the guide member is disposed on the same side as the transparent member with respect to a space through which the sheet passes.

3. An image reading apparatus according to claim 2, wherein the leading end of guide member is positioned on a side of the space through which the sheet passes than a surface of the transparent member with respect to a perpendicular direction perpendicular to the surface of the transparent member.

4. An image reading apparatus according to claim 1, wherein the conveyance unit includes a first roller pair provided upstream of the reading position with respect to the sheet conveyance direction and a second roller pair provided downstream of the reading position with respect to the sheet conveyance direction, and
wherein as seen in a sheet widthwise direction perpendicular to the sheet conveyance direction, the guide member crosses a nip line connecting a nip portion of the first roller pair and a nip portion of the second roller pair.

5. An image reading apparatus according to claim 1, further comprising a supporting member configured to support the sheet member,
wherein the sheet member includes a first region supported by the supporting member, a second region extending from the first region to a downstream side with respect to the sheet conveyance direction, and a third region extending from a downstream end of the second region with respect to the sheet conveyance direction to an upstream side with respect to the sheet conveyance direction and overlapped with the second region, and
wherein the folded portion is a portion between the second region and the third region of the sheet member.

6. An image reading apparatus according to claim 5, wherein the third region includes an end surface of the sheet member, and
wherein the end surface is positioned on a side opposite to the space through which the sheet passes across the second region of the sheet member.

7. An image reading apparatus according to claim 5, wherein the guide member includes an adhesive layer provided on one surface of the sheet member,
wherein the first region of the sheet member is adhered to on the supporting member by the adhesive layer, and
wherein the second region and the third region of the sheet member are adhered to each other by the adhesive layer.

8. An image reading apparatus according to claim 7, wherein the adhesive layer includes a conductive double-side tape.

9. An image reading apparatus according to claim 1, wherein at least a part of the sheet member has a conductivity.

10. An image reading apparatus according to claim 9, further comprising a conductive supporting member configured to support the sheet member,
wherein the sheet member is electrically connected to the supporting member.

11. An image reading apparatus according to claim 9, wherein a volume resistivity of the sheet member is 10^3 Ω·cm or more and is 1.2 GPa or less.

12. An image reading apparatus according to claim 1, wherein a Young's modulus of the sheet member is 0.8 GPa or more and is 1.2 GPa or less.

13. An image reading apparatus according to claim 1, wherein the transparent member is a first transparent member, the reading unit is a first reading unit, the guide member is a first guide member and the sheet member is a first sheet member, and
further comprising:
a second transparent member disposed downstream of the first transparent member with respect to the sheet conveyance direction;
a second reading unit configured to read the image information through the second transparent member from an opposite surface of the sheet to a surface of the sheet from which the first reading unit reads the image information; and
a second guide member provided downstream of the reading position where the first reading unit reads the image information from the sheet with respect to the sheet conveyance direction and upstream of a reading position where the second reading unit reads the image information from the sheet, and configured to guide the sheet,
wherein the second guide member is formed by a second sheet-like sheet member having elasticity, and
wherein a leading end of the second guide member is a folded portion formed by folding back the second sheet member.

14. An image reading apparatus according to claim 1, further comprising a determining portion configured to determine whether an image of the sheet is normal or not based on the image information read by the reading unit.

15. An image forming apparatus comprising:
an image forming unit configured to form an image on a sheet;
a transparent member;
a conveyance unit configured to convey the sheet on which the image is formed by the image forming unit;
a reading unit configured to read an image information through the transparent member from the sheet conveyed by the conveyance unit; and
a guide member provided upstream of a reading position where the reading unit reads the image information from the sheet with respect to a sheet conveyance direction and configured to guide the sheet to the reading position,
wherein the guide member includes a sheet-like sheet member having elasticity, and
wherein a leading end of a downstream side of the guide member with respect to the sheet conveyance direction is a folded portion formed by folding back the sheet member.

16. An image forming apparatus comprising:
a transparent member;
a conveyance unit configured to convey a sheet;
a reading unit configured to read an image information through the transparent member from the sheet conveyed by the conveyance unit;
a guide member provided upstream of a reading position where the reading unit reads the image information from the sheet with respect to a sheet conveyance direction and configured to guide the sheet to the reading position; and
an image forming unit configured to form an image on a recording material based on the image information read by the reading unit,
wherein the guide member includes a sheet-like sheet member having elasticity, and
wherein a leading end of a downstream side of the guide member with respect to the sheet conveyance direction is a folded portion formed by folding back the sheet member.

* * * * *